Figure 1:
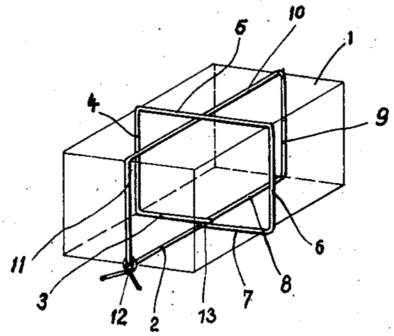

PROCESS AND DEVICE FOR THE AUTOMATIC TYING OF PARCELS

Erwin Freudling INVENTORS
Hans Eisinger, Paul Grönert
Wilhelm Rausch
BY
Michael S. Striker
Attorney PROCESS AND DEVICE FOR THE AUTOMATIC TYING OF PARCELS
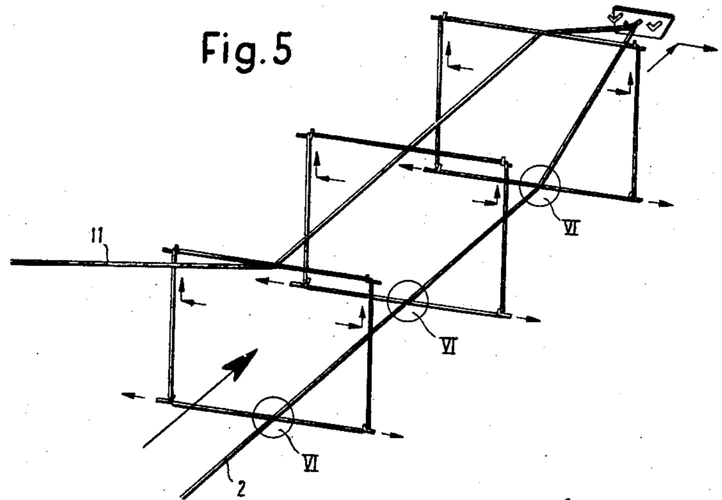
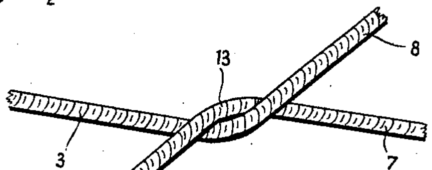
Fig.6
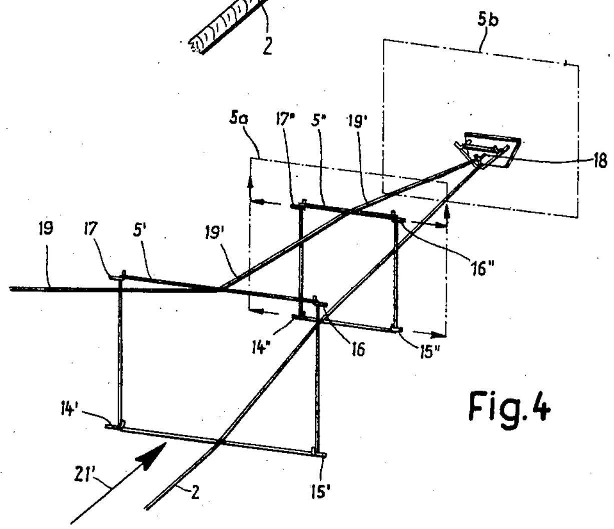
Fig.4
INVENTORS
Erwin Freudling
Hans Eisinger
Paul Grönert
Wilhelm Rauch
BY
Michael S. Striker
Attorney INVENTORS
Erwin Freudling
Hans Eisinger Paul Grünert
Wilhelm Rauch
BY
Michael S. Striker
Attorney

PROCESS AND DEVICE FOR THE AUTOMATIC TYING OF PARCELS

INVENTORS
Erwin Freudling, Hans Eisinger, Paul Grönert, Wilhelm Ranek
BY
Michael S. Striker
Attorney INVENTORS
Erwin Freudling
Hans Eisinger, Paul Gompert
Wilhelm Rauch
BY
Michael S. Striker
Attorney INVENTORS
Erwin Freudling
Hans Eisinger, Paul Grönert
Wilhelm Rauch
BY
Michael S. Striker
Attorney Fig. 11
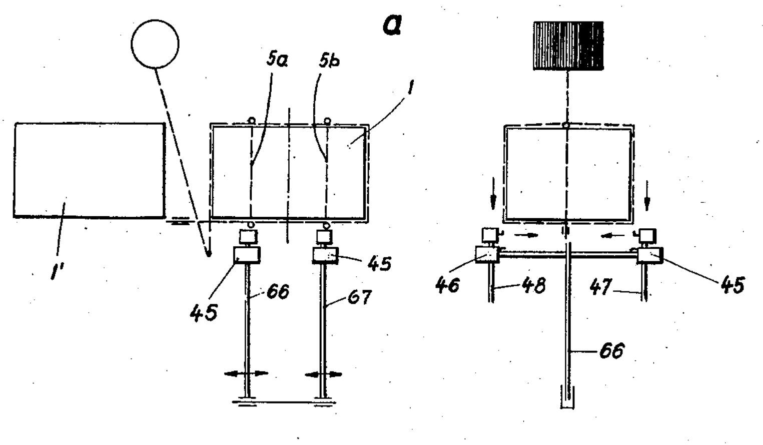
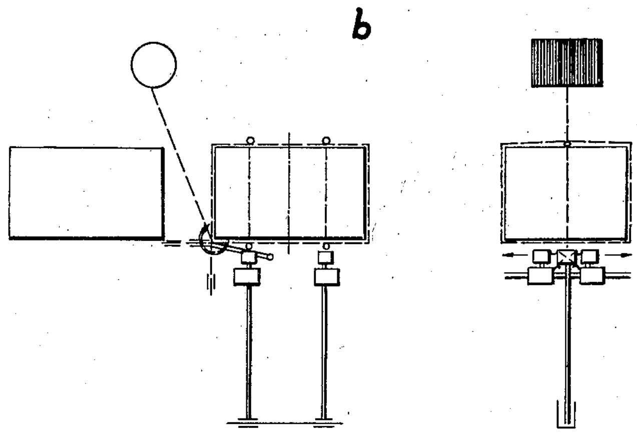
INVENTORS
Erwin Freudling, Hans Eisinger, Paul Gronert, Wilhelm Ranel
BY
Michael S. Striker
Attorney March 12, 1963 E. FREUDLING ET AL 3,080,811
PROCESS AND DEVICE FOR THE AUTOMATIC TYING OF PARCELS
Filed Oct. 12, 1959 16 Sheets-Sheet 8
Fig. 11
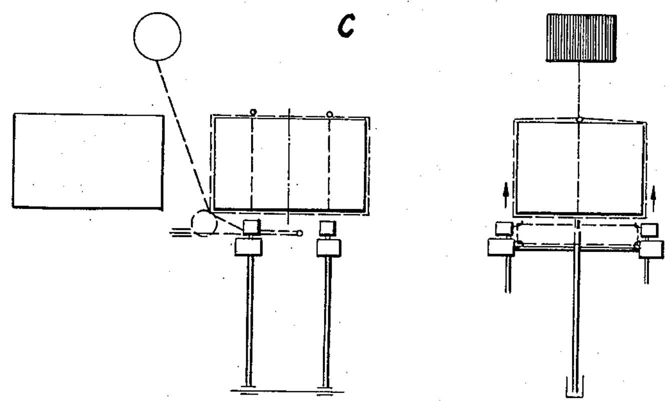
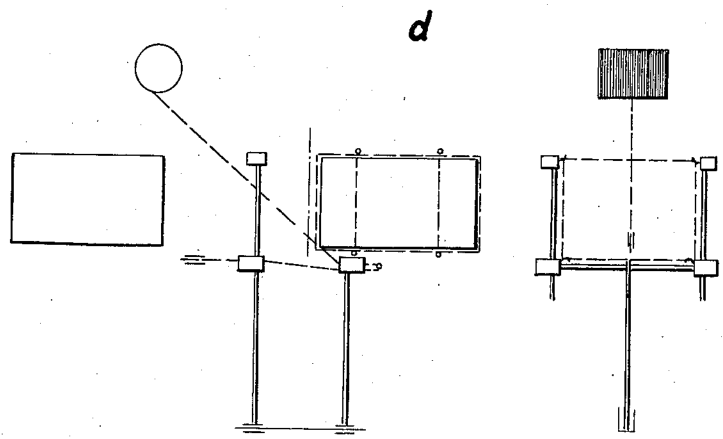
Erwin Freudling INVENTORS
Hans Eisinger, Paul Grünert
Wilhelm Rausl.
BY
Michael S. Striker
Attorney

PROCESS AND DEVICE FOR THE AUTOMATIC TYING OF PARCELS

Filed Oct. 12, 1959 16 Sheets-Sheet 9

Erwin Freudling INVENTORS
Hans Essinger Paul Gronert
Wilhelm Rausch
BY
Michael S. Striker
Attorney

PROCESS AND DEVICE FOR THE AUTOMATIC TYING OF PARCELS

Erwin Freudling INVENTORS
Hans Eisinger, Paul Grenert
Wilhelm Rauch
BY
Michael S. Striker
Attorney PROCESS AND DEVICE FOR THE AUTOMATIC TYING OF PARCELS
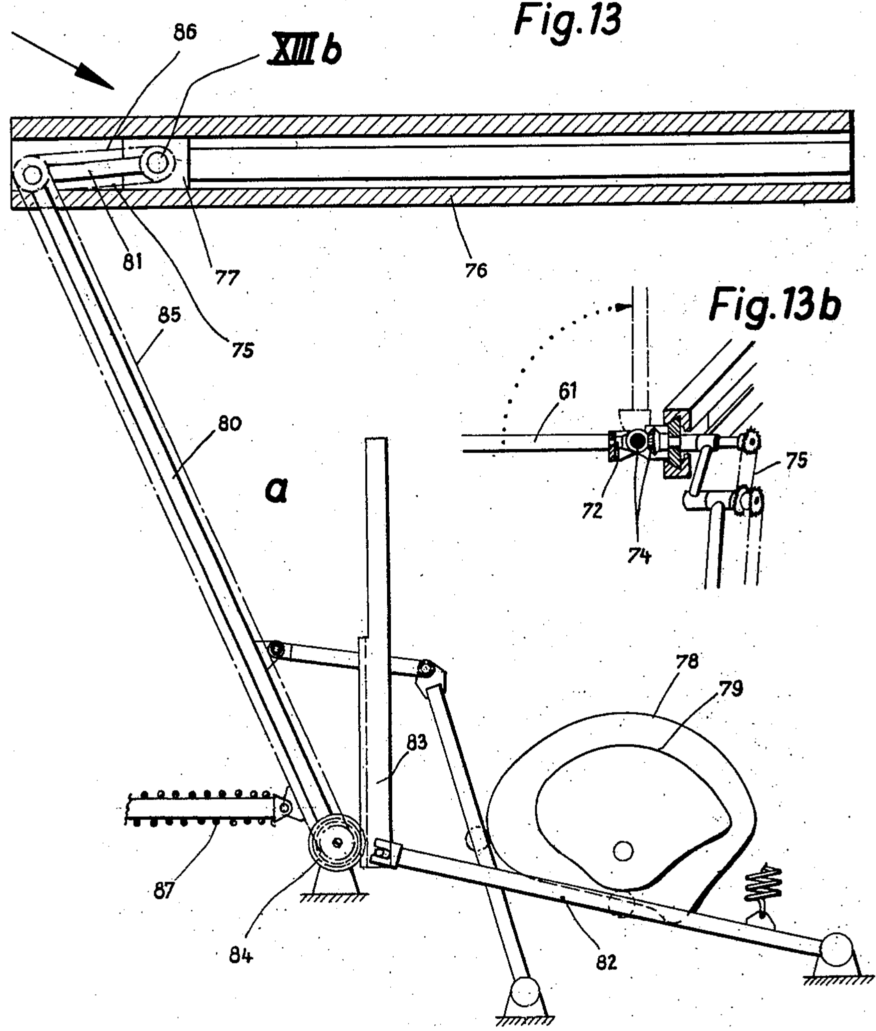
Erwin Freudling INVENTORS
Hans Eisinger, Paul Grönert
Wilhelm Rausch
BY
Michael S. Striker
Attorney PROCESS AND DEVICE FOR THE AUTOMATIC TYING OF PARCELS
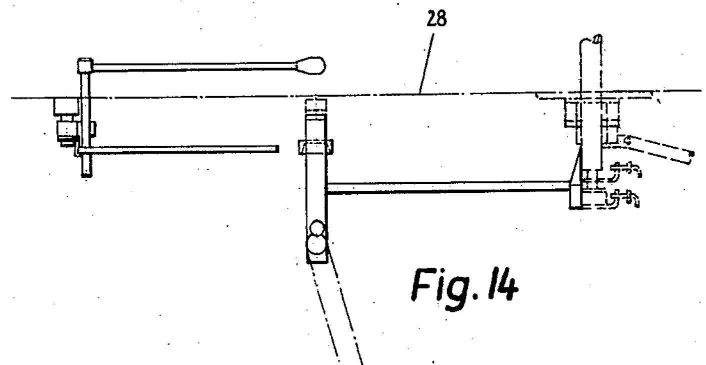
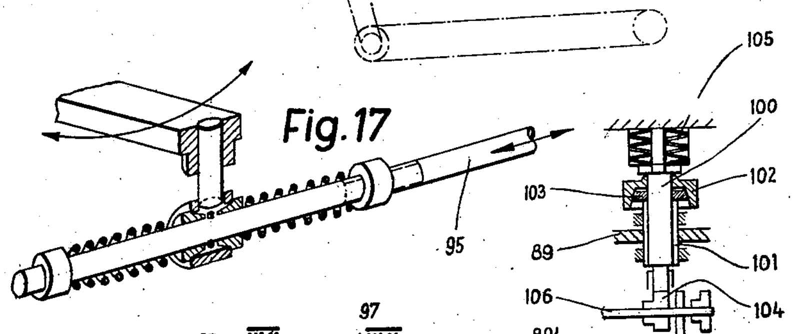
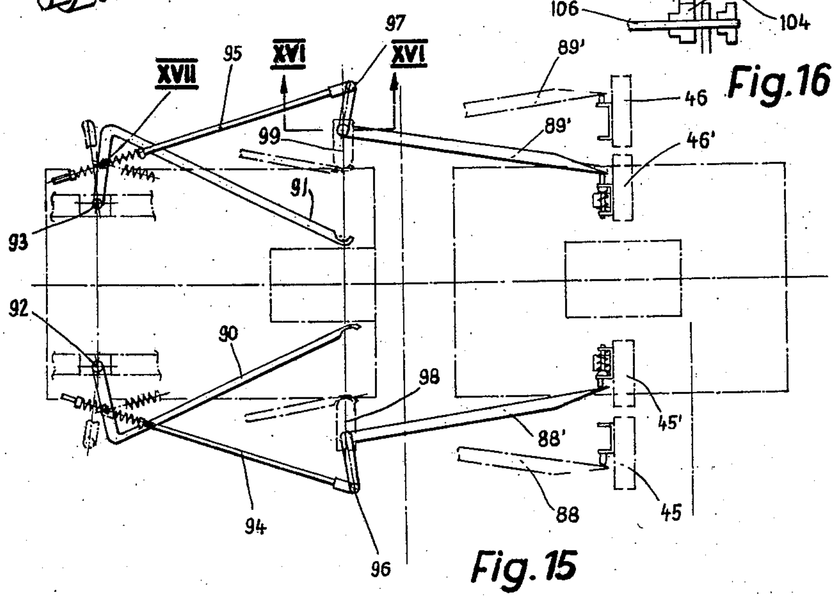
Erwin Freudling INVENTORS
Hans Eisinger Paul Grönert
Wilhelm Kaml
BY
Michael S. Striker
Attorney

PROCESS AND DEVICE FOR THE AUTOMATIC TYING OF PARCELS

Filed Oct. 12, 1959 16 Sheets-Sheet 13

Erwin Freudling, Hans Eisinger, Paul Grünert, Wilhelm Rauch INVENTORS

BY

Michael S. Striker

Attorney

Fig. 22
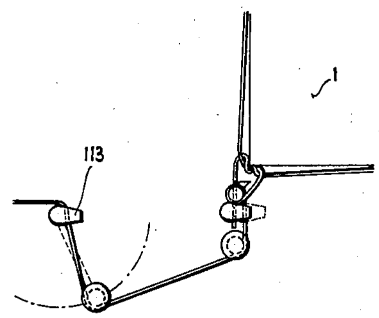
Fig. 23
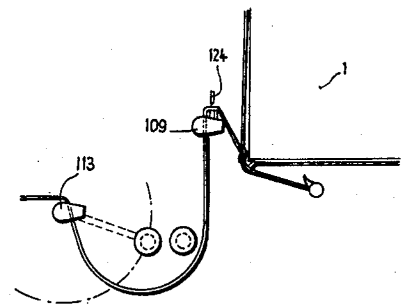
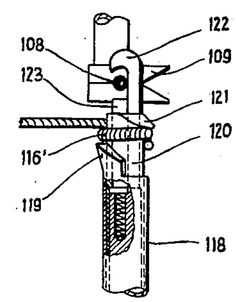
Fig. 24
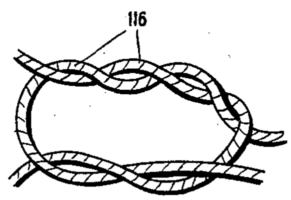
Fig. 25
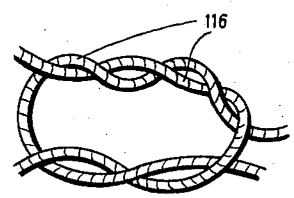
Fig. 26
Erwin Freudling INVENTORS
Hans Eisinger, Paul Grönert
Wilhelm Rauch
BY
Michael S. Striker
Attorney INVENTORS
Erwin Freudling
Hans Eisinger, Paul Grönert
Wilhelm Rund
BY
Michael S. Striker
Attorney

PROCESS AND DEVICE FOR THE AUTOMATIC TYING OF PARCELS

Filed Oct. 12, 1959 16 Sheets-Sheet 16

Erwin Freudling, Hans Eisinger, Paul Grenert, Wilhelm Ranul INVENTORS
BY Michael S. Striker
Attorney United States Patent Office 3,080,811 Patented Mar. 12, 1963

3,080,811

PROCESS AND DEVICE FOR THE AUTOMATIC TYING OF PARCELS

Erwin Freudling, Augsburg, Hans Eisinger, Haunstetten, Paul Grönert, Friedberg, and Wilhelm Rauch, Augsburg, Germany, assignors to Knotex Maschinenbau G.m.b.H., Augsburg, Germany, a company of Germany Filed Oct. 12, 1959, Ser. No. 845,859
Claims priority, application Germany Oct. 11, 1958
15 Claims. (Cl. 100—2)

The invention is concerned with a process for the automatic tying of parcels and small packages etc., especially with such a process for forming a cross-over tie with knotting, preferably in such a manner which will permit parcels of different sizes to be dealt with; non-metallic materials such as polished twine, string, cord and such like are chiefly considered as means for tying. The invention is furthermore concerned with devices which are essential for the carrying out of the process, are useful or can be used successfully in addition.

The invention contains several groups of main characteristics, in the first instance the following:

(I) The process itself, applicable to single and multiple crosswise tying.
(II) The device for the forming of loops.
(III) The means for controlling or the feeler devices, respectively, for the forming or the determination of the sizes of the loops, respectively.
(IV) The loop-forming elements proper and the control organs belonging to them.
(V) The knotting device, and finally
(VI) A special feature concerning the feed bobbin.

To start with it should be noted that the now following considerations assume the shape of the parcels to be that of a cube; but as a rule a shape of parcel which has also got rectangular sections will occur in practice. This does not preclude the consideration of other shapes of parcels, to which the invention should be adapted analogously.

Among the problems on which the invention is based are the following:

It is attempted to achieve an as far as possible automatized tying.

It is attempted to shape the tying-up process in such a way that in the course of its duration or in between its various phases there is no need to re-position the parcels or parcel respectively.

It is attempted to keep the total time required for one tying of one parcel as short as possible.

It is attempted to shape the tying in such a way that it cannot be undone. In this special care should be taken that some of the tying-zones are not able to be displaced by any considerable amount with respect to the other tying-zones.

It is attempted to carry out and shape the knotting of the tie in such a manner that the tied string is pulled tight to a strong degree, this being done also by means of the knotting operation if possible.

It is attempted to make possible the tying of parcels of most varying sizes without having to employ protracted additional means.

It is attempted to have single or multiple transverse tying, in other words to be able to tie up short or long parcels reliably.

It is attempted to keep the time required for changing the feed bobbin to a possible minimum.

It is attempted to carry out the knotting of the tie preferably in such a manner that it cannot be undone, this to be achieved without any additional means, e.g., further knots, clips (metal clips) or such like, which would remain on the parcel.

It is attempted to create a device which not only automatizes a tying-up process in a far-reaching manner, but also saves material, requires only a minimum of operational work and is not of too complicated a design, in order to be always in working order under what are, after all, rough working conditions.

Up to now so-called tying automats have become known which are not at all equipped to achieve a truly automatic tying. One well-known device works in such a way that the parcel, which has been deposited on a table with perhaps crosswise slots in it is furnished with longitudinal ties, after which process the means are created by hand, either on a fixed table or by turning a table which can rotate on a vertical axis, to also form the transverse ties. This however does not result in good and complete tying of the parcel, because the longitudinal ties and the transverse ties remain movable within a wide margin with respect to each other, since they do not support each other; a genuine tying-point between the longitudinal thread and the transverse thread is missing.

The first basic idea of the invention is a process working in such a way, that the loop which is to form the transverse tie of the parcel is produced in a suitable manner to be the same size of the parcel section or a slightly larger size respectively, after which the parcel is pushed into this loop and subsequently the longitudinal tie is produced which may have been partly pre-formed and is now fully tied round the parcel, after which the total tie-up is completed by knotting the thread-ends of the longitudinal loop.

A further step within the context of this first idea of the invention is the provision of several loops (transverse loops) placed at intervals and adapted to the size of the section of the parcel, either in such a manner that all such loops are being pre-formed to the size of the section of the parcel or, respectively, slightly larger, or otherwise in such a manner that these loops are being pulled apart one after the other to their final size according to the pushing in progress of the parcel, whereupon, after the parcel has been fully pushed into the loops and preferably whilst it is not moving, the longitudinal tie is being formed or completed and the knotting takes place.

Within the context of this first idea of the invention it is furthermore of importance that a genuine cross-over thread-tie results between the longitudinal part of the tying and the transverse part of the tying, preferably below the parcel or respectively, below the space taken up by the inserted parcel, which will prevent a displacement of the longitudinal tying and the transverse tying or loop (transverse loop) with respect to each other, either completely or to a very great extent.

In this connection it is also advantageous to make provision for an organ which will pull the thread-range of the longitudinal tying far enough in the direction of the incoming and outgoing parcel to allow the parcel to be pushed in sufficiently far, and that after the parcel has been completely pushed in not only the transverse tie or ties, respectively, or loops, respectively, have been basically pre-formed but also a great deal of the longitudinal tie.

The invention also includes the characteristic feature that the longitudinal tie is also basically pre-formed, however, it being open in the direction from which the parcel is to be pushed in, and that the organ which forms and/or pulls this longitudinal tie releases the longitudinal tie shortly before the tying-up process is completed or before knotting commences, respectively, whilst the ends of the thread which are being cut off at this point, or later, come under the influence of the knotting organ (knotter), so that the longitudinal tie can be closed and the whole tying-up process be completed.

In one zone of the parcel, e.g. on its underside, are to be found one or several genuine thread cross-over ties, as has been mentioned already, but these are not to be found in other parcel zones, e.g. on the top side of the parcel; in this way it is therefore possible to achieve a sufficiently substantial shortening of the longitudinal tie during the knotting process, which will result in a corresponding tightening of the whole tie-up making the latter tight-fitting, taut and firmly closing.

The second main idea of the invention concerns the device proper. It includes the organs for producing one or several loops forming the transverse tyings, the organs being preferably in the shape of hooks, the movement of which is controlled and which grip the corners of the loops from inside.

According to the invention these loop-hooks may be movable for instance in the plane of the parcel section, or in a plane which is parallel to the latter, that is, they may be moved in a controlled fashion, for instance taking the example of the rectangular loop (transverse loop), the two lower hooks may perhaps only be movable horizontally sideways away from each other (and together again), whilst the two upper hooks are movable sideways as well as up (and down), the movement being a combined one if necessary.

The third essential idea of the invention concerns again the device proper. According to this idea the means employed for forming the loops, for instance the hooks mentioned before, are being controlled in congruity or geometrical similarity or dependence, respectively, with the section of the (incoming) parcel in such a way, that one such loop forming the transverse tie or several of them respectively, are being formed simultaneously or together, these loops being of a size which will allow the parcel to be pushed into them, the pushing occurring at right angles to their plane; the means to achieve this are being stated in the invention to include feeler devices acting directly or indirectly by mechanical, electrical, hydraulic, pneumatic, electronic or optical means, respectively.

In the case of the feeler devices having been conceived as a mechanical design they might take the shape of simple rotatable feeler arms, in which case one or several of these feeler organs, respectively, whatever their shape may be, would guide into their final position the loop-forming elements or respectively the elements controlling the forming of the (transverse) loops, such as the above-mentioned hooks, either by direct or indirect means. The feelers may be special preliminary feelers and/or may be interchangeable in different sizes or shapes; if, for example only a few parcel sizes, for instance three are intended, the feelers may be omitted and a corresponding number of loop sizes, for instance three, may be produced by exchanging or switching over certain organs.

Additional means could be provided and steps taken here to ensure that once a loop has been formed it will be maintained in its finally controlled shape, respectively the loop-forming organs (hooks) be fixed in their set end position even if the action of the feeler devices has been superseded or, respectively, has collapsed. Prnicipally, the loop is maintained until the parcel has been pushed into it and, if necessary has come to a standstill, and then of course the loop-forming organs (hooks) are being removed from the precincts of the loop, since the latter is now resting on the parcel and does not require the loop-forming organs any longer.

The fourth group of characteristics concerns the formation of the loops proper and therefore contains organs which produce the loop or loops which are to form the transverse tie and which in addition prepare the longitudinal tie or, respectively, get hold of the length of thread provided for the longitudinal tie and pull it open, or respectively, apart by a certain amount in the direction of the parcel exit. These organs may for instance be dependent in their operational timing on the knotting organ for the knot and on the thread running off the feed bobbin, and which latter may for instance be cut off after having been gripped and subsequently in connection with other parts of the knotting organ may form the knot itself together with the other end of the thread and complete the tying whilst considerably shortening the total length of tying; it is of no importance here whether the cutting takes place before or after the knotting has been completed, both ways are possible.

The fifth group of characteristics finally concerns the knotting device itself, in other words the organ used for knotting.

The sixth group of characteristics concerns a special design of the feed-bobbin carrier as well as a special feed-bobbin.

Further details may now be gathered from the subsequent detailed description, which should be read in conjunction with the drawings. In these drawings the figures represent the following.

Figure 2:
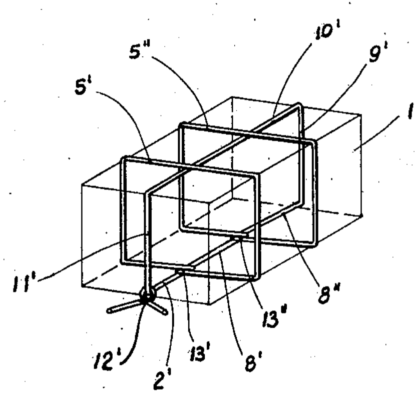
Figure 3:
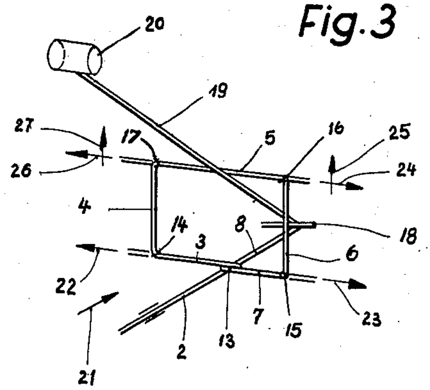
Figure 7:
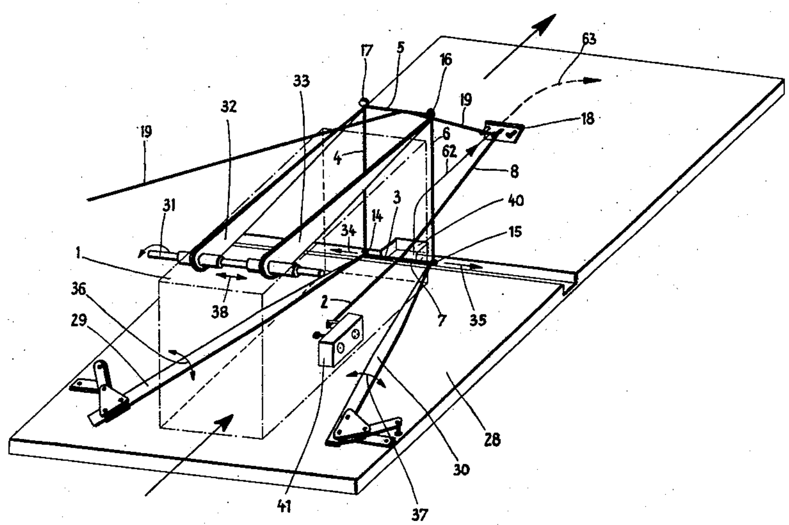
Figure 8:
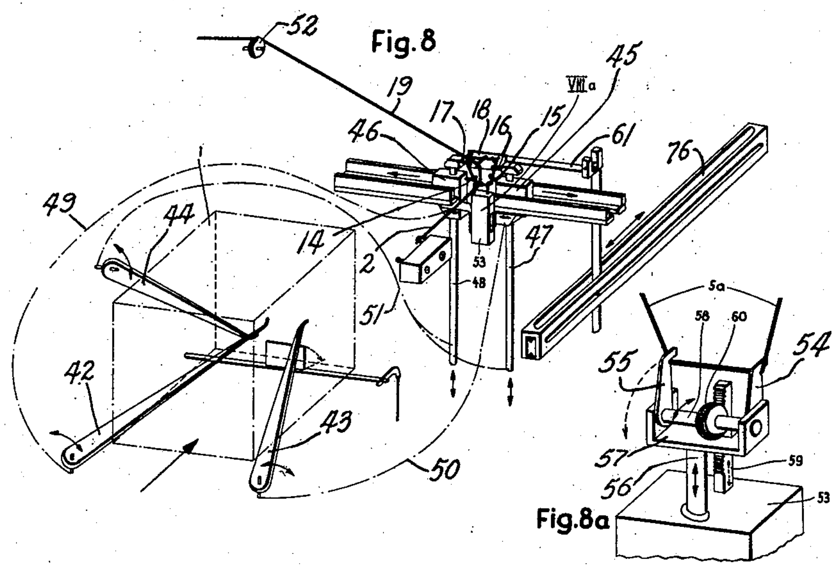
Figure 9:
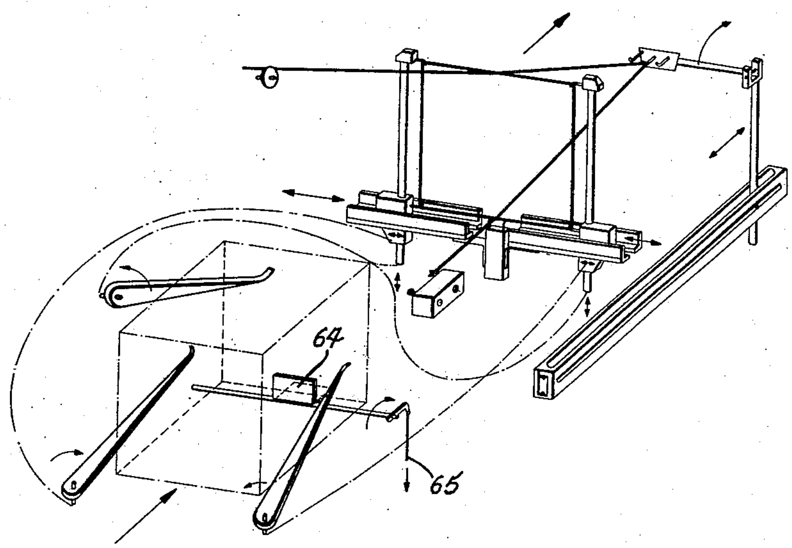
Figure 10:
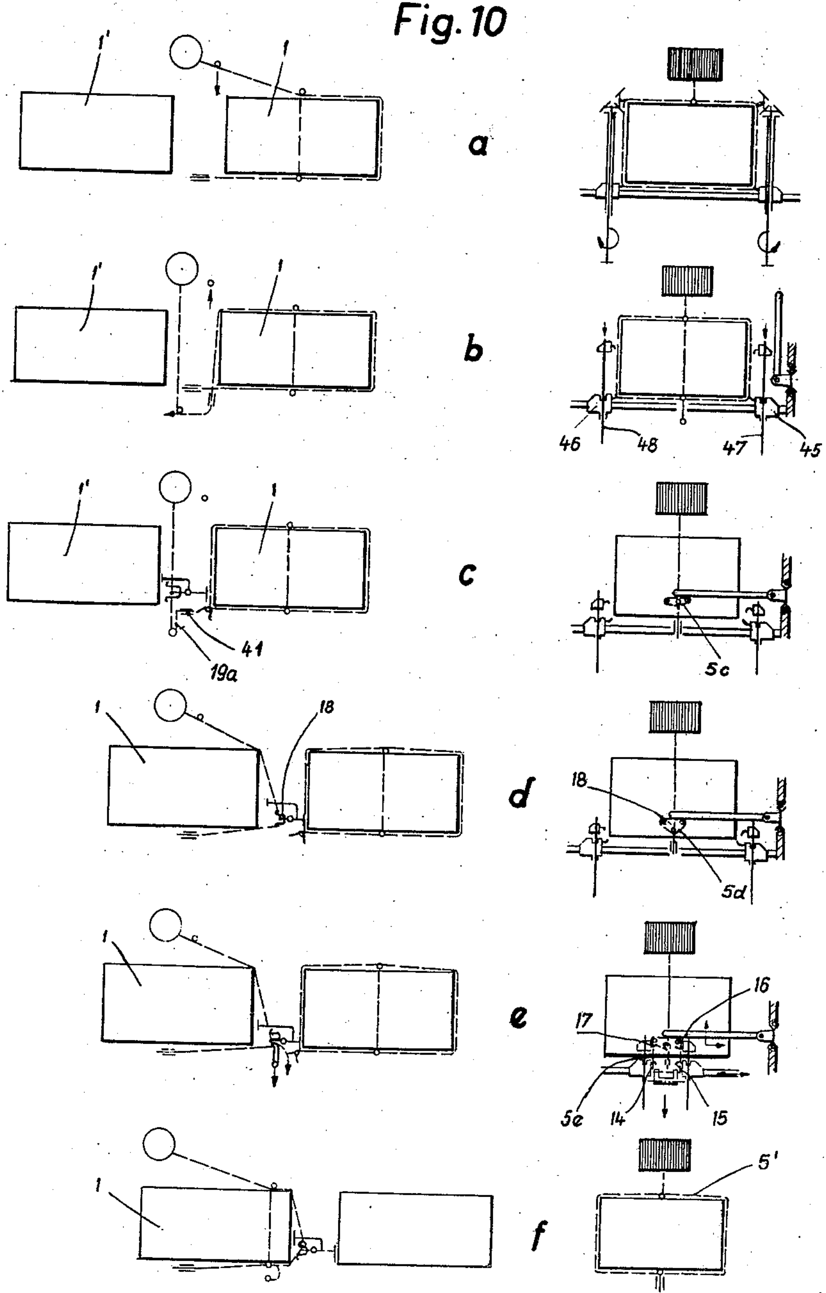
Figure 11:
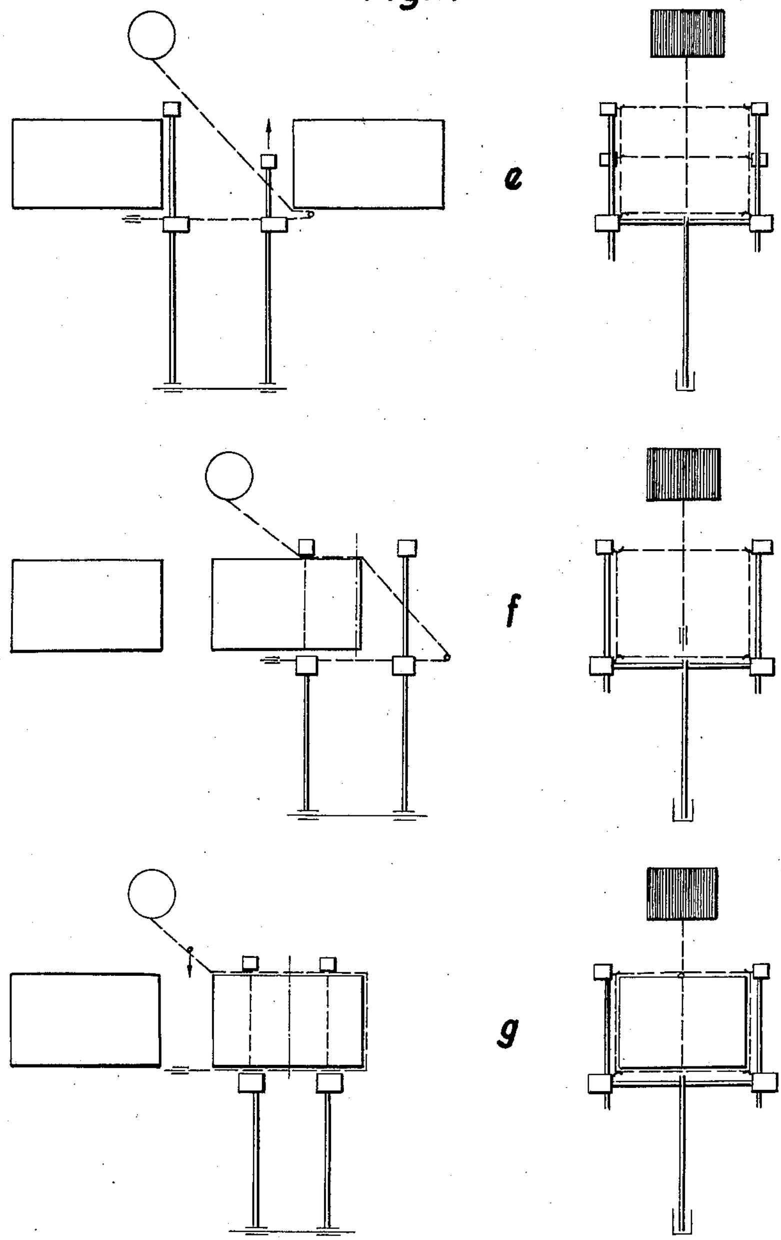
Figure 12:
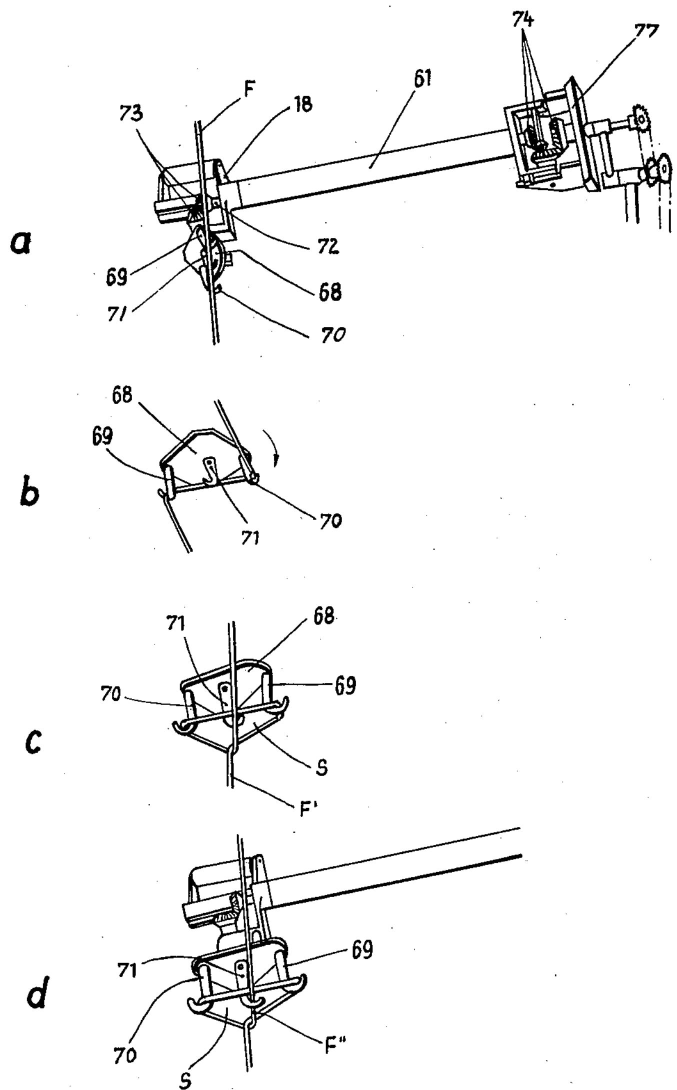
Figure 27:
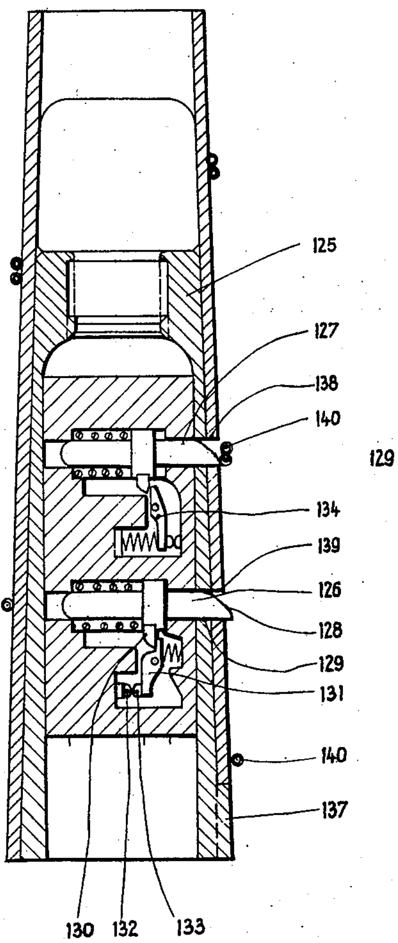
Figure 28:
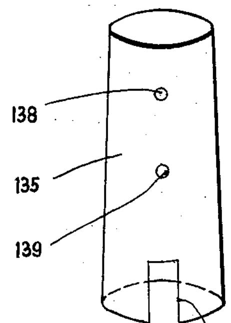
Figure 29:
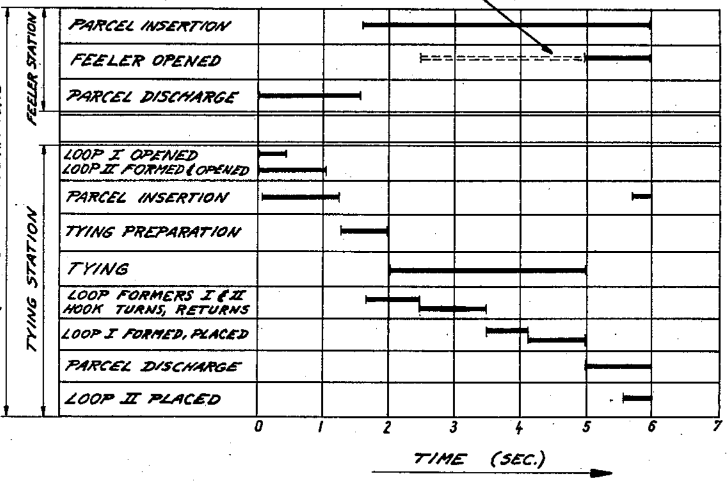

FIG. 1, a perspective view of a simple tying of a parcel,

FIG. 2, a schematic perspective view of a double tying of a parcel,

FIG. 3, a perspective view of the commencement of the tying process, the parcel itself having been omitted for clarity, FIG. 4, the start of the formation of a multiple tying, FIG. 5, the multiple tying with completely pre-formed transverse ties, FIG. 6, an enlarged view of a thread cross-over point according to VI in FIG. 5, FIG. 7, a mechanical feeler device, FIG. 8, the mechanical feeler device including views showing the control mechanism for the loop forming organs, FIG. 8*a* is a detail of FIG. 8, FIG. 9, a view similar to FIG. 8 but showing the completely formed loop, FIG. 10, successive illustrations *a* to *f* showing the process of pushing in and tying up a parcel with simple tying in both side elevation and end view, FIG. 11, successive illustrations *a* to *g* showing the process analogously to FIG. 10 but with double transverse tying of the parcel, both in side elevation and end view, FIG. 12, illustrations *a* to *d* showing the loop forming element, FIG. 13, the mechanism for moving the loop forming element, FIG. 13*b*, a partial section of item XIII*b* in FIG. 13, seen approximately in the direction of the arrow in FIG. 13, FIGS. 14 and 15, a side-elevation and plan view of a feeler control mechanism, FIG. 16, a section XVI—XVI in FIG. 15, FIG. 17, a slightly enlarged and partly sectioned perspective view of region XVII in FIG. 15, FIGS. 18 to 24, various illustrations mainly in side elevation with plan view below, of the region of the knotting mechanism, FIG. 24 representing an enlarged view of the actual knotter, FIGS. 25 and 26, possible shapes of knots, FIG. 27, the feed-bobbin carrier showing the feed-bobbin in position, FIG. 28, the feed-bobbin (without thread) in reduced size, FIG. 29, a chart showing a timing diagram of the working phases.

FIG. 1 shows the parcel 1 with the tying up regions completed. The course of tying up takes in successively the thread regions 2, 3, 4, 5, 6, 7, 8, 9, 10, 11 and the knot 12 joins the correspondingly cut-off thread regions 2 and 11. The transverse tying, usually called loop in the following paragraphs, is thus formed from the regions 3, 4, 5, 6, 7, whilst the longitudinal tie is formed from the regions 2, 8, 9, 10, 11. It is important that region 13, as shown (in a slightly different way) in FIG. 6, is a genuine thread cross-over tie, for instance in such a manner that region 2 is connected to region 3 or region 7, whilst region 8 is connected either to region 7 or region 3.

FIG. 2 showing the possibility of a multiple tying, shows therefore the loops 5' and 5'' placed parallel at some distance from each other, and thus corresponding cross-over tie points 13' and 13'' are formed.

According to FIG. 2 the thread 2' runs up to point 13' then runs round the parcel 1 in the form of transverse loop 5' then runs on as region 8' from point 13' from there onwards in the shape of the transverse second loop 5'', then again further on from point 13'' as region 8'', then 9' and 10' as well as 11'. Knot 12' joins here the thread regions 2' and 11'.

FIG. 3 shows what the start of the complete process looks like.

On the basis of a tie up according to FIG. 3 the loop to be formed is produced as follows. The hooks 14, 15, 16, 17 seize in a manner to be described later, a loop which at that stage is still very small and which is formed by the incoming thread 2 and the regions 3, 4, 5, 6, 7, a further region 8 going off backwards in the direction of thread 2, this being controlled and pulled backwards by some pulling organ 18. The thread 8, coming from above, or respectively going in that direction towards region 19, comes from or, respectively, leads to the feed-bobbin 20. It is important that the thread 19 enters the inside of loop 3, 4, 5, 6.

The parcel now arrives in the direction of 21, for instance on a table above the hooks 14, 15; before the parcel has reached the loop 3, 4, 5, 6, hooks 14, 15 are pulled apart in the direction of arrows 22, 23 horizontally and hooks 16, 17 are pulled in the directions of arrows 24, 25 and 26, 27 sideways and upwards far enough to make the internal section of the loop 3, 4, 5, 6, 7 slightly larger than the external sectional profile of the parcel.

If one and the same size of parcel is always involved, the movement of hooks 14, 16, 16, 17 can take place according to a fixed (or if required, variable) programme, for instance by controlling them with cams or in a similar manner (it is possible to have interchangeable cams).

If on the other hand different shapes of parcels are to be dealt with, then the movement of the said hooks 14, 15, 16, 17 will be governed by the size of parcel itself or, respectively, by the size (height and width) of the parcel section, or, respectively, directly or indirectly controlled by it, for instance by feeler organs monitoring the said parcel section on the outside.

The parcel is now being pushed into the device in the direction of arrow 21 until it reaches, with respect to loop 3, 4, 5, 6, 7, the (pushed in) relative position towards this loop as shown in FIG. 1; subsequently the pulling organ 18 is being disconnected from the thread 8, 19 (longitudinal tie), the thread 19 is being seized at a suitable point and knotted together with the thread 2; thus the thread region 19 in FIG. 3 corresponds to the thread regions 10 and 11 in FIG. 1. The knotting operation causes a tightening of the threads constituting the complete parcel tie-up by pulling together the knot, also causing a corresponding pulling together of the loop 3, 4, 5, 6, via cross-over tying point 13, resulting in a properly tied parcel as a final product, which is subsequently pushed out of the device in the direction of 21. Then the forming of a new loop 3, 4, 5, 6 commences and the process is repeated, the incoming parcel being transported automatically. It goes without saying that it is of course possible to automatize the general supply and/or removal of parcels to or from the device.

FIG. 4 shows that a first loop 5' (similar to FIG. 2) and a second loop 5'' are being formed one after the other. Thus the region 19' (corresponding to 10' in FIG. 2) is being pulled through the interior of the two loops 5' and 5'' by the pulling organ. For this process the first loop 5' is being formed to start with by means of the hooks 14', 15', 16', 17' and lagging behind in the timing, the loop 5'' is then being formed by the hooks 14'', 15'', 16'', 17'' which work and move in a corresponding fashion; the enlarging of this loop 5'' to its full size 5*a* takes place during the pushing in of the parcel in the direction of 21', if necessary through monitoring of the parcel, and in consequence of this monitoring the formation of loop 5' will be controlled too by the monitoring of the parcel.

Analogously a third loop 5*b*, shown in its full size in FIG. 5, can be produced, which again may be lagging in its timing behind the formation of the loop 5'' or 5*a*, respectively. This may then result either during the pushing in of the parcel or even before it is pushed in in the preformed and partly finished tying shown in FIG. 5.

The crossing points VI in FIG. 5 are shown enlarged in FIG. 6; they correspond exactly or analogously to points 13 or 13', respectively, in FIGS. 1 or 2, respectively. Again, the total process is completed here by joining thread ends 2 and 11 into a knot.

FIG. 7 shows how the hooks for forming the loops can be controlled directly by a mechanical feeler device, this being done in such a way that the hooks are carried on the feeler device itself.

The table 28 has mounted on it two lateral feeler arms 29, 30, which can be suitably rotated and if necessary adjusted; the table 28 also carries a shaft 31, the bearings for which have been omitted, the shaft being possibly adjustable in height in order to cater for extreme variations in the height dimensions of different parcels; generally the shaft 31 will be mounted in a fixed position with respect to table 28 however, and at a suitable height from it.

This shaft 31 carries feeler arms 32, 33 which are movable axially but can be rotated round shaft 31.

Their function is now as follows: Each feeler arm 29, 30, carries a hook 14, 15, each feeler arm 32, 33 carries a hook 16, 17. The feeler arms 29, 30 have only one degree of freedom of movement, i.e. sideways movement according to arrows 34, 35 or 36, 37 respectively. The rotatable arms 32, 33 have two degrees of freedom of movement, being capable of pivotal motion about the shaft and also capable of bodily movement axially of the shaft, thus the hooks 16, 17 too, have two degrees of freedom of movement (up and down and sideways). The transverse groove in the table affords room to the hooks 14, 15 etc. The cut-out 40 affords room to the pulling organ 18 which initially is partly submerged in it.

Below the table is fixed a thread-clamp 41 which at the same time will be designed to form part of the knotter. The parcel 1 is shown here in its nearly pushed in position shortly before it enters the loop 3, 4, 5, 6, 7. The feeler arms 29, 30, 32, 33 are now monitoring the outside of the parcel section and thus via the hooks 14, 15, 16, 17 which seize the loop from inside, form the said loop 3, 4, 5, 6, 7 during which operation the region 2 of the thread remains being held fast at 41. The region 8 is being pulled out by the pulling organ 18 and then changes below thread region 5 into region 19 (this being shown purposely in the lifted-off position), whilst of course a corresponding change of direction takes place at 18. The parcel is now being pushed further into the device until it has about reached the position shown in FIG. 1. At this moment the hooks 14, 15, 16, 17 disconnect themselves from the loop 3, 4, 5, 6, 7 which operation may be carried out by the most varied of means, for instance the said hooks 14, 15, 16, 17 might be attached to their corresponding feeler arms 29, 30, 32, 33 by means of links, their movement may also be controlled; finally they can also be shaped in such a way that in consequence of such shape they will allow the loops to be slipped off. Subsequently the pulling organ 18 will release the threads 8, 19, for instance by turning its grip-hook or by extending a link-hook or in some similar manner, so that subsequently the knotting process can take place between the regions 2, 19 (equal to the regions 10, 11 in FIG. 1).

FIG. 8 shows an indirect control mechanism for the loop-forming organs depending in some way or another on the momentary position of the feeler organs.

Referring to FIG. 8 a set of feeler organs is provided, fitted to the table which has been omitted from the drawing, this set need here only to consist of three arms, these being the feeler arms 42, 43 for lateral monitoring and the feeler arm 44 for monitoring the height of the parcel 1. It is appropriate here to combine the hooks 14, 15, 16, 17 usually in pairs, each of which is attached to a sliding block 45, 46 movable laterally. The combination is carried out in such a way, that one sliding block 45 has firmly fixed to it the hook 15, and perhaps carries the hook 16 via a guided rod 47, which is adjustable in height; correspondingly, the other sliding block 46 has firmly fixed to it the hook 14, and, via the guided rod 48 the hook 17.

The operation takes place in such a way that the feeler arm 42 controls a lateral movement of the sliding block 46 via a mechanical, or pneumatic, electrical or similar transmission 49 according to the monitoring, whereby the monitoring takes place along a longitudinal side of the parcel 1 (on the left hand side of the illustration). The sliding block 45 is being moved laterally by its corresponding feeler arm monitoring the right hand side of the parcel and operating via a transmission 50 which is analogous or similar in design to 49. The feeler arm monitoring the height of the parcel induces a corresponding upward movement of the two rods 47, 48 via the transmission 51. All in all the forming of the loop is achieved in such a manner, that the hooks 14, 15 are only moved sideways, while the hooks 16, 17 are moved sideways as well as upwards. The total end result is again a loop formed according to FIG. 3, i.e. 3, 4, 5, 6, 7 into which the parcel 1 is subsequently pushed.

FIG. 8 shows the loops being formed, where the loop is therefore still very small but is already being seized by the hooks 14, 15, 16, 17 after having just been produced. The formation of the loop is by virtue of a special loop former, see FIG. 8*a*. At this state of the loop the pulling organ has already come into action and thus seized thread region 2.

FIG. 8*a* shows a necessary or at least advantageous component which has a share in the formation of the small loop. The component in question consists of a block 53 on which are mounted movable or respectively controlled movable auxiliary hooks 54, 55, which can be moved up and down say via the guided rod 56 in block 53, this rod 56 carrying a bearing bracket 57 with a shaft 58 allowing the two auxiliary hooks 54, 55 to rotate so that via the rack 59 which can move in and out of block 53 and the pinion 60 on shaft 58 and the two hooks 54, 55 may be made to disengage from the loop which has been given the index **5*a* here, after this said loop 5*a* has been seized by all its hooks 14, 15, 16, 17. In this case the organ chiefly engaged in the formation of the loop the pulling organ 18**, the function of which will be described later. However, it might be mentioned at this stage that this pulling organ possesses several hooks, say three, of which at least one may be movable in a certain manner or respectively, may be rotatable or, respectively, movable axially.

The pulling organ 18 is movable via a still to be described control and moving device 61, this movement taking place according to FIG. 7 in the direction of the arrows 62, and then sideways removed according to arrow 63; to start with the pulling organ therefore, will pull out the thread region 8, 19 and subsequently after disengagement, remove itself from the region of the parcel exit.

FIG. 9 shows the device according to FIG. 8, but with a partly or completely opened-up loop.

It may also be mentioned that for instance a swinging flap 64 which falls away from the parcel during its feed may, via the transmission 65, trigger off or effect some motion or control to operate on the table 28. For instance, the falling down of flap 64 might cause the subsequent pushing in operation to run its course automatically and might also control one or several of the operations connected with this.

FIG. 10 shows in illustration (*a*) a parcel 1 in its final position and a further parcel 1' which is just coming in and is still in its monitoring position.

The loops for the parcel 1 are already existing in their entirety, the tying up process is being continued according to illustration (*b*) and according to illustration (*c*) the knotting is being completed, in which the thread end **19*a* is being gripped by the clamping organ 41** after having been released by being cut off. Now, according to illustrations (*c*) and (*d*), the loop forming ing organ 18, which is also the pulling organ comes into action and forms a small loop **5*c*** (somewhat similar to the process in FIG. 8). This loop opens out according to illustration (*d*) into the loop **5*d*** then further according to illustration (*e*) into a square loop **5*e* then, after having been passed over to the hooks 14, 15, 16, 17 finally into loop 5' (or 5*a*, 5*b***, too), so that the parcel can be pushed into the loop and the whole process is repeated according to illustration (*a*).

It should be mentioned here that the forming of the loop can be brought about by a corresponding turning movement of 18, such as is described later on according to FIG. 12.

Of course after the process has been completed, or, respectively, whilst the process is being completed the hooks 14, 15, 16, 17 together with the elements carrying them (for instance 45, 46, 47, 48) must move towards each other again into the smallest space, so that the new small loop **5*d*** can be seized from the inside.

FIG. 11 shows basically the same thing, the only difference being the multiple tying of the parcel, two or more loops **5*a*', 5*b*' having been formed here at spaced intervals from each other. The sliding blocks 45, 46 and the guided rods 47, 48**, in other words the hook-carrying organs can be seen in the illustrations (*a*) to (*g*) of FIG. 11. These organs are thus provided in duplicate, each lot being perhaps carried by a column 66, 67. The interval between the columns 66, 67 may also be made controllable or, respectively, automatically controllable, for instance with dependence on the length of the parcel 1.

FIG. 12 now shows the primary loop forming organ 18 proper in its four different phases of movement (*a*), (*b*), (*c*) and (*d*).

This organ consists to start with basically of a head plate 68; on this head plate are mounted three finger-shaped hooks 69, 70, 71 which protrude in the direction towards the loop and which should preferably lie in a straight line with each other or in one plane. It should be remarked that the finger shaped hooks 69, 70 are movable with respect to the head plate for instance rotatable, or they may also be fixed with respect to this head plate 68, whilst the middle finger-shaped hook 71 will in general be movable and especially rotatable and/or axially movable with respect to the head plate 68, if necessary it might even be made to swing out from the head-plate. All this depends on the manner in which the head plate is being made to move. If a rocking motion is provided for the head plate the special movability of the finger-shaped hook 71 may in certain circumstances be dispensed with, but in all such cases special care should be taken with the design of the points and curves of the hook, which can however be found easily by experiment.

The procedure is now to get the head plate 68 in the first instance into the position shown in illustration (*a*) of FIG. 12 by means of the operating mechanism 61 to which the head plate 68 is fixed or, respectively, movably attached, this to take place in such a way that it can catch the thread, which here only carries the index F, in the finger-shaped hooks 69, 70, 71, during which operation all three finger-shaped hooks 69, 70, 71 seize the thread F. For this the thread F should preferably be in a vertical position, since it will form after all part of the longitudinal tying later on, this part forming approximately the region where the regions 8 and 19 in FIG. 7 change direction.

A swinging, turning or if necessary rocking movement of the head-plate 68 brings about the state shown in illustration (*b*), in which the row of finger-shaped hooks 69, 70, 71 stands in a roughly horizontal position; then the head plate 68 continues its rocking motion, if necessary with a corresponding disengaging movement of the (central) finger-shaped hook 71, so that now according to illustration (*c*) only the two outer finger-shaped hooks remain in engagement and the triangular loop S is being formed, this triangular shape being achieved by means of a pull in the region F' of the thread.

A further rocking motion ensues, or, respectively, a re-engagement movement of the middle finger-shaped hook 71, so that the middle region F'' of the thread F, which thus crosses the loop, is being seized. It should be mentioned that during the first stages of illustrations (*a*) and (*b*) it is not absolutely necessary for the middle finger-shaped hook 71 to be in engagement but in order to produce the stage shown in illustration (*d*) the finger-shaped hook 71 must get hold of the thread region F''.

Subsequently the hooks 14, 15, 16, 17 seize the loop S (equal to 5' or 5*a*, respectively) from the inside and expand it, so that the outer regions of the loop are being lifted out of the outer finger-shaped hooks 69, 70; however, the middle finger-shaped hook 71 pulls thread region F'' backwards through the loop S, so that this thread region F'' is transformed here into the regions 8, 19 of FIGS. 7 or 3 respectively.

The correct movement of the head plate 68 requires a corresponding operating mechanism which must also be able to induce the movement according to the arrows 62, 63 shown in FIG. 7. It must also be able to cause the correct movement that is swinging, rocking or a similar one of the head plate 68, finally, if required, it must control the movement of the finger-shaped hooks, especially that of the finger-shaped hook 71.

This movement can be produced by means of various devices, FIGS. 13 and 13*b* in conjunction with FIG. 12 may serve as examples.

The hollow arm 61 houses a shaft 72. On the one side this shaft 72 is connected to the head plate 68 via a pair of bevel gears (see FIG. 12*a*) on the other side it is connected via a gear box 74 to the chain drive 75. The gear box 74 is carried in a block 77 which can slide in the guide 76. Two operations are caused by the control mechanism which can best be seen in FIGS. 13, 13*b* and particularly by the cams 78, 79.

The control cam 78 moves the link 80 in such a way, that the latter moves the block 77 in its guide 76 through the loose link 81 thus causing a movement of the entire element 18 roughly in the horizontal feed direction of the parcel.

The second cam 79 moves the rack 83 via its follower arm 82 thus by means of the meshing pinion the chain wheel 84 is rotated, and from the latter via the ganged-together chains 85, 86 the shaft 72 within the hollow arm 61. Thus the cam 79 causes the turning or, respectively, rocking movement of the head plate 68.

It should be expressly noted here that the above is only one example of such a control mechanism. Tension or compression springs and similar arrangements may be provided, for example the spring 87 in FIG. 13.

According to FIGS. 14 to 17 the hooks 14, 15, 16, 17 for opening up the loop may be fitted in, or respectively, on the sliding blocks 45, 46 the controlling being done here with the aid of limit switches, end stops or such like, set according to the monitoring. The sliding blocks therefore move from their positions 45, 46 into their final positions 45', 46' corresponding to the fully opened loop, when the stop levers 88, 89 which are controlled by the monitoring levers reach their final position as shown in FIG. 15. Positions 88' or, respectively 89' are intermediate positions, which for example correspond to a smaller size of parcel.

The feeler organs 90, 91 exist here in the shape of bell-crank levers which can rotate on fulcra or spindles 92, 93 in the table 28. There are two special devices fixed here, the first one of these being the spring-buffering for the rod 94, or 95, respectively, shown in FIG. 17, which rod connects the also bell crank shaped lever 88' or 89', respectively, with its appropriate feeler arm 90 or 91, respectively via a link 96 or 97 respectively. The buffering according to FIG. 18 creates the possibility to maintain the levers 88, 89, which after all govern the size of loop, in their position, even when the feeler arms 90, 91 have already taken up a position different to the one which would belong to the position of the former. This can be achieved by means of the second special device, this being the brake 98, 99 shown in axial section in FIG. 16. This brake comes into action, in other words brakes when the final position of the levers 88, 89 has been reached, the brakes being maintained as long as required, for instance until shortly before the next parcel is being monitored.

According to FIG. 16 the braking can be brought about in such a way that for instance a bush 101 in the lever 89 which normally turns freely on the short shaft 100 is locked. The short shaft 100 can be moved axially and has mounted on it in a fixed position the brake cone 102. The bush 101 carries the counter-cone 103. The short shaft 100 is being lifted against the action of the spring 105 by a cam 104, which is being controlled by some means or other, and thus the brake is released. If the cam 104 takes up a different position the short shaft 100 drops and the two brake cones 102, 103, are locked against each other, thus keping the lever 89 braked fast in its position. The cam shaft 106 will preferably be driven from the main drive this drive running in agreement with or respectively, dependence from the pushing in movement of the parcel or respectively, the incoming parcel's rate of progress. The sense and purpose of this measure is the bridging of the gap in the timing of two successive parcels in other words some sort of temporary fixation of storage of the correct position of the loop-forming organs for the previously monitored parcel which is already being pushed into the loop.

The knotting operation is being described in conjunction with FIGS. 18 to 24.

The task is the knotting of the threads 107, 108 which correspond to the thread regions 2 and 11 in FIG. 1. The complete knotting organ consists of a large number of single parts, these being a clamp 109, two pilleys 110, 111, the pulley 110 and the pulley 111 each being able to alter their position independently from each other according to certain rules. The pulley 111 is chiefly mounted in a swivelling organ 112, which can either be fitted apart or might also be fitted in a further clamp 113 which allows it to swivel.

The members 110, 111 enumerated so far, and, if required, the members 112 as well as 113 are provided to deal with the thread 108, or, respectively, 108' and its continuation.

The clamp 109 as well as the knotter 114 proper, for which a detailed description will still have to be given, are provided to deal with the thread 107, in which the knotter 114 has of course also got to get hold of the thread 107.

Figure 18:
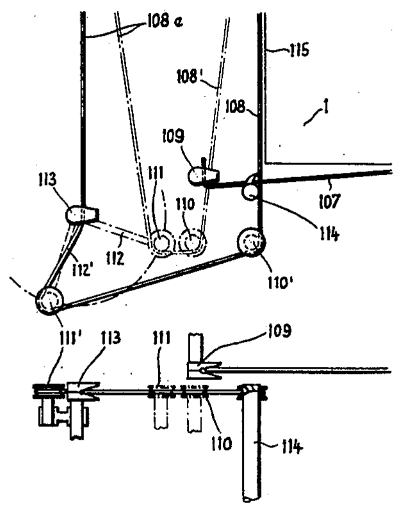
Figure 19:
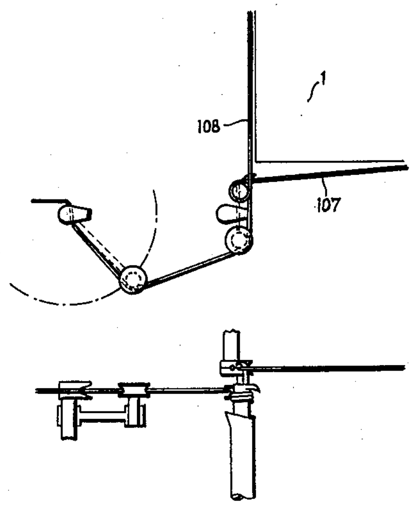

As can be seen from the lower part of FIG. 18 the organs 111' 113 and 112 are arranged in one plane from which they need not protrude. The thread knotter 114 proper contains parts, however, which can be moved roughly at right angles to this above mentioned plane. Clamp 109 lies in another parallel plane, preferably at short distance (see bottom of FIG. 18).

Figure 20:
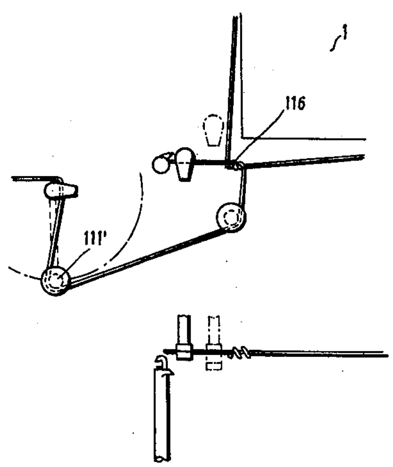
Figure 21:
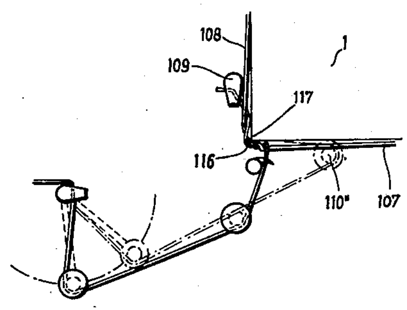

Roughly described the procedure takes place initially in such a way, that to start with the thread in position 108′ runs over the pulleys 110, 111, whereby the region 108*a* goes to the feed bobbin. Now the pulley 110 runs to the right into the position 110′, corresponding to the pull of thread 108 which lies close to the front face 115 of the parcel 1. Through an ingenious operation of the organs of the knotter 114 proper the two threads 107 and 108 are provided with a single or double crossover tie 116 (FIG. 20), then they are being pulled tight, on the one hand by the swinging of pulley 111 into position 111′, and on the other hand by an upwardly directed movement of the clamp 109, with the result that the cross over 116 comes to rest on the edge of the parcel 117 where it is stretched tight; in this the change of position of the pulley 110 into the stretching position 110″ as shown in FIG. 21 also takes a share. Then follows according to FIGS. 21 and 23 the second tying of the threads, which is brought about by the thread knotter 114 proper in conjunction with the other elements and finally finishes off the knot, whereby according to FIG. 25 a knot of a certain kind may be formed, or, according to FIG. 26, an extended weaver's knot.

According to FIG. 24 the thread knotter 114 consists of a sleeve 118 which possesses a stripping off nose 119. In this sleeve 118 the also hollow knotter core 120 with its beak shaped attachment 121 is mounted axially movable and rotatable. The knotter core 120 in turn carries the knotting needle 122, which can also be moved axially. Now if the thread 107 (but if required also 108) comes into contact with the knotter 114 by means of operation of the pulleys, clamps etc., then these items operate in such a way that the knotter core remains stationary, but that the sleeve 118 has been moved off by a certain amount (according to FIG. 24 in a downward direction) so that the thread 108 is enabled to wrap itself around the knotter core 120 below the beak shaped attachment 121 either once or several times, this being brought about by corresponding twisting of the knotter core 120 with respect to the sleeve 118; in case of a two-fold wrapping it is advisable to choose two and one eighth revolutions of the knotter core 120 against the non-turnable sleeve 118.

After the wrapping has been completed—116′ in FIG. 24 corresponds, even if not yet completely, to 116 in FIGS. 25 and 26—the knotting needle 122 seizes the other thread 108 (or alternatively 107) and pulls it subsequently with a downward movement of the knotting needle 122 according to FIG. 24 until the thread 108 strikes the jaw 123; the jaw 123 responds elastically with a downward movement, so that now the thread 108 is laying itself against the front edge of the by now turning beak-shaped knotter attachment 121, whilst the knotter core 121 including its beak-shaped attachment 121 is going down still further, so that the stripping off nose 119 now slips the loop 116′ over the thread 108 which at that moment is still being gripped; subsequently the thread 108 is being completely pulled through the loop 116′ so that finally the thread positions according to FIGS. 20, 21 and subsequently FIGS. 22 and 23 are obtained; in all this the thread 108 was fixed in the clamp 109 which opens at the appropriate moment, this being after the completion of the knot, somehow according to FIG. 23; subsequently the cutting shears 124 may sever the thread between the clamp 109 and the knot; the clamp 109 returns to its starting position according to FIG. 18, so that the thread region attached to it, which is still connected to the feed bobbin can be made available for forming the new loop and new tie. The clamp 113 opens on the termination of the knotting operation. The pulleys 110, 111 also disconnect themselves from the thread which according to FIG. 23 goes out from the clamp 109 towards the feed bobbin, in order to make this region available for the formation of the new loop.

According to the invention it is important during the formation of the knot that in consequence of the double wrapping (upper region in each case of FIGS. 25 and 26) a strong shortening of the knot takes place when the lower region is pulled together (FIGS. 25 and 26), this shortening increasing again the tautness of the threads 107, 108 during the knotting operation, a tautness, which had already been achieved through the operation previously of the various organs.

FIGS. 27 and 28 shows a carrier for a feed bobbin, chiefly of lightly tapered design.

With this it is of importance that warnings alarm, or, respectively, switching devices are provided.

The bobbin carrier 125 contains spring loaded organs 126, 127 which are transversely movable and carry or operate contact devices.

The organ 126 preferably provided with a chamfered nose 128 may protrude through a corresponding hole 129 in the bobbin carrier 125. It operates via an auxiliary nose 130 the contact lever 131, the direction of movement causing the two contact pins 132, 133 to come together and thus closing the circuit for the alarm device; in this the contact lever might be spring loaded in the opposite, contact opening direction.

The other organ 127 operates in a similar way, is similarly designed and operates the contact lever 134, but in such a way, that on the organ emerging on the right hand side (FIG. 27) the circuit connected there is being opened.

The circuit attached to the organ 126 is an alarm circuit which on closing (contact region 132, 133) gives an optical or acoustic signal, so that there will be a certain time lag before the operation attached to the other organ 127 (stopping) has been completed. During this length of time a new feed bobbin can be inserted and if required, its thread can be knotted to the thread of the old bobbin; for this purpose one might provide two bobbin carriers next to each other.

The organ 127 opens the circuit which governs the running of the machine; therefore if the organ 127 emerges on the right hand side according to FIG. 27 the machine is stopped.

In order to position the bobbin or bobbin core 135 correctly on the bobbin carrier, the former contains according to FIGS. 27 and 28 a cut out 136 which, when the bobbin is in position fits over a projection 137 on the bobbin carrier 125. The holes 129 which the bobbin carrier 125 contains for the emergence of the organs 126, 127 will then coincide the correspondingly provided holes 138, 139 of the bobbin core 135.

The effect of these organs is therefore such that in the case of the whole bobbin core 135 still being covered by one layer of thread 140 these organs 126, 127 are not able to protrude and thus effect neither alarm nor stopping. But as soon as the surface of the bobbin core 135 becomes free of thread in the region of organ 126, the organ 126 jumps out and effects the alarm, after some time—in case a new bobbin has not been fitted or a change over to the other bobbin carrier with a new bobbin has taken place—the machine is being stopped because the surface in the region of 127 becomes also free of the thread layer 140′.

FIG. 29 shows the various operating phases and above all gives an idea of the short time required to carry out the complete operation thanks to a far-reaching overlapping of the various events which make it up.

Automatic parcel feed and/or parcel disposal (e.g. moving belts) may be provided. The pulling organ 18 might be used for pushing the parcel out.

We claim:

1. The method of tying an object, comprising the steps of forming a flexible cord into a closed transverse loop located in a transverse plane and into an open longitudinal loop; moving the object and said loops relative to each other in a longitudinal direction substantially normal to said transverse plane from a position in which the object is located outside of said closed loop into a position in which said closed loop surrounds said object and said open loop partly surrounds said object; and then closing said open loop about said object.

2. An apparatus for tying a flexible cord about an object, comprising, in combination, means for forming a cord into a closed transverse loop and into an open longitudinal loop, and for holding and supporting said loops so that an object can be moved into said closed loop and into engagement with said open loop; and means for completing and tying said open loop about the object.

3. The method of binding an object comprising the steps of forming an open three-dimensional double loop one-piece cord structure composed of a closed loop located in a first plane and of an open loop located in a second plane transverse to said closed loop, said open loop intersecting said first plane and being closed on one side of said closed loop and open on the other side of said closed loop; placing an object on said other side of said closed loop opposite said open loop; moving said object and said three-dimensional double-loop cord structure relative to each other at least substantially normal to said first plane so that said object first moves into said open loop and then moving therein moves into said closed loop until the object is enveloped by both loops; and closing said open loop about said object.

4. An apparatus for binding a flexible cord about an object, comprising, in combination, means for forming a cord into a closed loop located in a first plane and into an open loop located in a second plane transverse to said first plane and being closed on one side of said closed loop and open on the other side of said closed loop whereby a three-dimensional cord structure open on said other side of said first loop is formed, said means supporting said structure; and means for moving the object and said structure relative to each other and in a direction substantially normal to said first plane for placing the object in said open cord structure surrounded by said closed loop and in engagement with said open loop; and means for completing and tying said open loop about the object.

5. The method of binding an object comprising the steps of forming an open three-dimensional double loop one-piece cord structure composed of a small closed loop located in a first plane and of an open loop located in a second plane transverse to said closed loop, said open loop intersecting said first plane and being closed on one side of said closed loop and open on the other side of said closed loop; enlarging said closed loop to substantially match the peripheral outline of an object to be tied; enlarging said open loop on said one side of said closed loop corresponding to another peripheral outline of the object; placing an object on said other side of said closed loop opposite said open loop; moving said object and said three-dimensional double-loop cord structure relative to each other at least substantially normal to said first plane so that said object first moves into said open loop and then moving therein moves into said closed loop until the object is enveloped by both loops; closing said open loop about said object; tensioning said loops of said cord structure; and tying said closed formerly open loop.

6. The method of binding an object comprising the steps of forming an open three-dimensional double loop one-piece cord structure composed of a small closed loop located in a first plane and of an open loop located in a second plane transverse to said closed loop, said open loop intersecting said first plane and being closed on one side of said closed loop and open on the other side of said closed loop; sensing the peripheral outlines of the object; enlarging said closed loop to substantially match the sensed peripheral outline of an object to be tied; enlarging said open loop on said one side of said closed loop corresponding to another sensed peripheral outline of the object; placing an object on said other side of said closed loop opposite said open loop; moving said object and said three-dimensional double-loop cord structure relative to each other at least substantially normal to said first plane so that said object first moves into said open loop and then moving therein moves into said closed loop until the object is enveloped by both loops; closing said open loop about said object; tensioning said loops of said cord structure; and tying said closed formerly open loop.

7. The method of binding an object having a rectangular cross section, comprising the steps of forming an open three-dimensional double loop one-piece cord structure composed of a rectangular closed loop located in a first plane and of an open loop located in a second plane transverse to said closed loop, said open loop intersecting said first plane and being closed on one side of said closed loop and open on the other side of said closed loop; enlarging said closed loop to substantially match the peripheral outline of an object to be tied; enlarging said open loop on said one side of said closed loop corresponding to another peripheral outline of the object; placing an object on said other side of said closed loop opposite said open loop in a position in which the rectangular cross-section thereof is located in a plane parallel to said first plane; moving said object and said three-dimensional double-loop cord structure relative to each other at least substantially normal to said first plane so that said object first moves into said open loop and then moving therein moves into said closed loop until the object is enveloped by both loops; closing said open loop about said object; tensioning said loops of said cord structure; and tying said closed formerly open loop.

8. The method of binding an object comprising the steps of forming in a cord a closed loop located in a first plane and having a crossing point; drawing cord through said closed loop, and forming of the drawn cord an open loop located in a second plane perpendicular to said first plane and extending from said crossing point to a portion of said first closed loop opposite said crossing point, said open loop being closed on one side of said closed loop and open on the other side thereof whereby an open three dimensional cord structure is formed; placing the object opposite said open cord structure on said other side of said closed loop; moving said open cord structure and the object relative to each other in a direction perpendicular to said first plane so that one end of said object is located in said open cord structure with said closed loop surrounding the object and said open loop partly surrounding said object; drawing cord and laying the drawn cord about the other end of the object to close said open loop in said second plane; and tying the drawn cord to a cord portion extending from said crossing point to the other end of the object.

9. The method of binding an object comprising the steps of forming in a cord a small closed loop located in a first plane and having a crossing point; drawing cord through said closed loop, and forming of the drawn cord an open loop located in a second plane perpendicular to said first plane and extending from said crossing point to a portion of said first closed loop opposite said crossing point, said open loop being closed on one side of said closed loop and open on the other side thereof whereby an open three dimensional cord structure is formed, enlarging said closed loop until the same is slightly larger than the corresponding peripheral outline of the object; enlarging said open loop corresponding to the peripheral outline of the object; placing the object opposite said open cord structure on said other side of said closed loop; moving said open cord structure and the object relative to each other in a direction perpendicular to said first plane so that one end of said object is located in said open cord structure with said closed loop surrounding the object and said open loop partly surrounding said object; drawing cord and laying the drawn cord about the other end of the object to close said open loop in said second plane; and tying the drawn cord to a cord portion extending from said crossing point to the other end of the object.

10. The method of binding an object comprising the steps of forming in a cord a small closed loop located in a first plane and having a crossing point; forming additional closed loops in planes parallel to said first plane; drawing cord through said closed loop, and forming of the drawn cord an open loop located in a second plane perpendicular to said first plane and extending from said crossing point to a portion of said first closed loop opposite said crossing point, said open loop being closed on one side of said closed loop and open on the other side thereof whereby an open three dimensional cord structure is formed; enlarging said closed loop until the same is slightly larger than the corresponding peripheral outline of the object; enlarging said open loop corresponding to the peripheral outline of the object; placing the object opposite said open cord structure on said other side of said closed loop; moving said open cord structure and the object relative to each other in a direction perpendicular to said first plane so that one end of said object is located in said open cord structure with said closed loop surrounding the object and said open loop partly surrounding said object; drawing cord and laying the drawn cord about the other end of the object to close said open loop in said second plane; and tying the drawn cord to a cord portion extending from said crossing point to the other end of the object.

11. An apparauts for binding a flexible cord about an object, comprising, in combination, means for forming a cord into a closed loop located in a first plane and into an open loop located in a second plane transverse to said first plane and being closed on one side of said closed loop and open on the other side of said closed loop whereby a three-dimensional cord structure open on said other side of said first loop is formed, said means supporting said structure; means for moving one end of an object into said open cord structure so that the object is surrounded by said closed loop and in engagement with said open loop; and means for completing and tying said open loop about the other end of the object.

12. An apparatus for binding a flexible cord about an object comprising, in combination, means for forming a cord into a closed loop located in a first plane and into an open loop located in a second plane transverse to said first plane so that said open loop is closed on one side of said first plane and open on the other side of said first plane whereby three-dimensional cord structure open on said other side of said first plane is formed; spreading means including a set of hooks movable between a more closely spaced position and a spread position, said hooks being adapted to engage said closed loop for enlarging the same; means for moving one end of the object into said open cord structure so that the object is surrounded by said closed loop and in engagement with said open loop; means for laying the cord about the other end of the object so as to complete said open loop; and means for tying the completed open loop.

13. An apparatus for binding a flexible cord about an object comprising, in combination, means for forming a cord into a closed loop located in a first plane and into an open loop located in a second plane transverse to said first plane so that said open loop is closed on one side of said first plane and open on the other side of said first plane whereby three-dimensional cord structure open on said other side of said first plane is formed; spreading means including a set of hooks movable between a more closely spaced position and a spread position, said hooks being adapted to engage said closed loop for enlarging the same; sensing means for sensing the outline of the object and controlling said spreading means so that said hooks assume a spread position corresponding to the outline of the object; means for moving one end of the object into said open cord structure so that the object is surrounded by said closed loop and in engagement with said open loop; means for laying the cord about the other end of the object so as to complete said open loop; and means for tying the completed open loop.

14. An apparatus as set forth in claim 13 wherein said sensing means include two pairs of sensing levers, each sensing lever supporting one of said hooks.

15. An apparatus as set forth in claim 13 wherein said spreading means include a pair of slide members movable toward and away from each other in one direction and supporting two of said hooks, and a pair of slide rods respectively mounted in said slide members for movement in a direction perpendicular to said one direction, said slide rods supporting two other hooks, said sensing means being operatively connected to said slide members and slide rods for controlling the movement of the same.

References Cited in the file of this patent

UNITED STATES PATENTS

| | | |
|---|---|---|
| 2,367,658 | Burn | Jan. 23, 1945 |
| 2,853,938 | Hall | Sept. 30, 1958 |
| 2,913,270 | Sachsonroder et al. | Nov. 17, 1959 |